(12) United States Patent
Rover et al.

(10) Patent No.: US 7,386,629 B2
(45) Date of Patent: Jun. 10, 2008

(54) SYSTEM AND METHOD FOR SYNCHRONOUS CONFIGURATION OF DHCP SERVER AND ROUTER INTERFACES

(75) Inventors: Jeremy L. Rover, Beaverton, OR (US); Amber D. Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 10/611,591

(22) Filed: Jun. 30, 2003

(65) Prior Publication Data

US 2004/0267949 A1 Dec. 30, 2004

(51) Int. Cl.
*G06F 15/173* (2006.01)

(52) U.S. Cl. ............ 709/238; 709/220; 709/221; 709/222; 709/223; 370/389

(58) Field of Classification Search ........ 709/220–223, 709/238; 370/389, 401
See application file for complete search history.

(56) References Cited

U.S. PATENT DOCUMENTS

| | | | |
|---|---|---|---|
| 5,751,967 A | 5/1998 | Raab et al. | |
| 5,926,463 A * | 7/1999 | Ahearn et al. | 370/410 |
| 5,964,837 A | 10/1999 | Chao et al. | |
| 6,047,330 A | 4/2000 | Stracke, Jr. | |
| 6,061,334 A | 5/2000 | Berlovitch et al. | |
| 6,075,776 A | 6/2000 | Tanimoto et al. | |
| 6,131,119 A | 10/2000 | Fukui | |
| 6,167,052 A * | 12/2000 | McNeill et al. | 370/401 |
| 6,173,411 B1 | 1/2001 | Hirst et al. | |
| 6,345,294 B1 * | 2/2002 | O'Toole et al. | 709/222 |
| 6,349,306 B1 | 2/2002 | Malik et al. | |
| 6,393,484 B1 * | 5/2002 | Massarani | 709/238 |
| 6,404,741 B1 | 6/2002 | Buhler et al. | |
| 6,499,115 B1 | 12/2002 | Wiedeman et al. | |
| 6,560,642 B1 * | 5/2003 | Nurmann | 709/220 |
| 6,651,093 B1 | 11/2003 | Wiedeman et al. | |
| 6,658,469 B1 | 12/2003 | Massa et al. | |
| 6,697,360 B1 * | 2/2004 | Gai et al. | 709/220 |
| 6,732,176 B1 | 5/2004 | Stewart et al. | |
| 6,741,592 B1 | 5/2004 | Edsall et al. | |
| 6,982,953 B1 * | 1/2006 | Swales | 709/220 |

(Continued)

FOREIGN PATENT DOCUMENTS

GB 2 365 252 A 2/2002

(Continued)

OTHER PUBLICATIONS

Pending U.S. Appl. No. 10/611,787, filed Jun. 30, 2003, inventor: Rover; Office Action dated Nov. 2, 2006.

(Continued)

*Primary Examiner*—Ario Etienne
*Assistant Examiner*—Ramy M Osman
(74) *Attorney, Agent, or Firm*—Philip A. Pedigo (57) ABSTRACT

A system and method for synchronous configuration of DHCP server and router interfaces is disclosed. A network management layer identifies a DHCP server interface and a router interface associated with the same subnet. The network management layer then determines configuration information for the DHCP server interface and the router interface. The DHCP server and the router are programmatically configured with the determined configuration information.

9 Claims, 10 Drawing Sheets

U.S. PATENT DOCUMENTS

| | | | |
|---|---|---|---|
| 7,051,087 B1 * | 5/2006 | Bahl et al. ................. | 709/220 |
| 7,069,320 B1 | 6/2006 | Chang et al. | |
| 7,088,674 B2 | 8/2006 | MacKiewich et al. | |
| 7,092,943 B2 | 8/2006 | Roese et al. | |
| 7,096,273 B1 * | 8/2006 | Meier ......................... | 709/236 |
| 7,114,006 B2 * | 9/2006 | Colvig et al. ............... | 709/221 |
| 7,152,099 B1 * | 12/2006 | Arens ......................... | 370/389 |
| 2002/0065919 A1 | 5/2002 | Taylor et al. | |
| 2002/0149601 A1 | 10/2002 | Rajarajan et al. | |
| 2002/0161867 A1 | 10/2002 | Cochran et al. | |
| 2003/0069960 A1 | 4/2003 | Symons et al. | |
| 2003/0120955 A1 | 6/2003 | Bartal et al. | |
| 2003/0212781 A1 | 11/2003 | Kaneda et al. | |
| 2003/0217145 A1 | 11/2003 | Mullen et al. | |
| 2003/0217148 A1 | 11/2003 | Mullen et al. | |
| 2004/0059813 A1 | 3/2004 | Bolder et al. | |
| 2004/0093400 A1 | 5/2004 | Richard et al. | |

FOREIGN PATENT DOCUMENTS

| | | |
|---|---|---|
| WO | WO 97/29605 | 8/1997 |
| WO | WO 00/74303 A2 | 12/2000 |
| WO | WO 03/048933 A1 | 6/2003 |

OTHER PUBLICATIONS

International Application No.: PCT/US2004/019615 Int'l Search Report & Written Opinion dated Oct. 11, 2004.

International Application No.: PCT/US2004/019614 Int'l Preliminary Report on Patentability dated Dec. 12, 2006.

Application No.: PCT/US2004/021086 Int'l Preliminary Report on Patentability, Chapter 1, dated Jan. 12, 2006.

Chien-Chung Shen: The Network as Distributed Object Database; 1998 IEEE; XP-000799525; pp. 540-548.

Herur et al: Management of Databases Using SNMP: A Framework for a Unified Database MIB; 1998 IEEE; pp. 29-32.

Routhier: Management Information Base for the Internet Protocol (IP); draft-ietf-ipv6-rfc2011-update-10.txt; May 2004; pp. 1-144.

Int'l Application no.: PCT/US2004/019698; PCT Search Report & Written Opinion dated Oct. 18, 2004.

Int'l Application no.: PCT/US2004/019699; PCT Search Report & Written Opinion dated Oct. 21, 2004.

Int'l Application no.: PCT/US2004/019614; PCT Search Report & Written Opinion dated Nov. 15, 2004.

Int'l Application no.: PCT/US2004/021086; PCT Search Report & Written Opinion dated Oct. 21, 2004.

Int'l Application no.: PCT/US2004/019698; PCT Int'l Preliminary Report on Patentability dated Dec. 12, 2006.

Int'l Application no.: PCT/US2004/019699; PCT Int'l Preliminary Report on Patentability dated Dec. 12, 2006.

Int'l Application no.: PCT/US2004/019615; PCT Int'l Preliminary Report on Patentability dated Dec. 12, 2006.

"AutoInstall Using DHCP for LAN Interfaces," Internet Citation, Cisco IOS Release 12.1(5)T, Feb. 22, 2001, pp. 1-12, XP-002210269.

Office Action mailed Jun. 4, 2007 for corresponding U.S. Appl. No. 10/610,989, filed Jun. 30, 2003, to Rover et al.

Office Action mailed Nov. 2, 2006 for corresponding U.S. Appl. No. 10/611,787, filed Jun. 30, 2003, to Rover et al.

"Management Information Base for the Internet Protocol (IP)", draft-ietf-ipv6-rfc2011-update-02.txt, Mar. 22, 2007, 98 pages.

V. Herur et al., "Management of Databases using SNMP: A Framework for a Unified Database MIB", University of Western Sydney, Nepean Australia, 4 pages.

* cited by examiner

402 — [Dynamic Network Devices]

{ ## DeviceName    OS(WIN2K|WINXP_PRO)
{ ## MAC_Address   Subnet_suffix    Card_type 404 — [Non-Dynamic Network Devices]

StaticDevName IPAddr1 ... IPAddrN

406 — [Power Management Devices]

HomeAddress (A-P)
DeviceCode (1-16)  AssociatedDevice

408 — [Hubs]

HubName
AssociatedDevicesName

410 — [VLAN Configuration]

switchName switchIp switchPassword controlPort
Port Num (list of ports)
AssociatedDevice (list of devices)

412 — [Routers]

{ ## routerName     password controlIP
{ ## interfaceType interface suffix

414 — [DHCP Servers]

dhcpServerName password controlInterface controlAddress subnet
interface ipSuffix subnetMask routerSuffix 416 — [Addressing Scheme]

prefixType prefix

FIG. 4

Subnet1 ⎫ 505
 Data data data...
 TopologyType1
 Data data data...
Device1 ⎫ 510
 Data data data
 PotentialMovement1
 ...
 PotentialMovementN
 ...
 DeviceN
 Data data data
 PotentialMovement1
 ...
 PotentialMovementN
...
SubnetN

500

FIG. 5 proc configRouter { ipAddr passwd intfType intfNum intfIp subnetMask ext permitIp }
　　　　　　　　　　605　　610　　615　　　　620　　　625　　　630　　　635　　640

705
⎫
⎬— SubnetGroupingType(internal, external)
715 ⎫
⎬— SubnetSubsection1
       Topology Type 1 (802.11a, 802.11b, etc)

Topology Type N (802.11a, 802.11b, etc)

SubnetSubsectionN
       Topology Type 1 (802.11a, 802.11b, etc)

710 ⎫  Topology Type N (802.11a, 802.11b, etc)
⎬— DeviceSection
    "n" DeviceTypes StartLocation

SYSTEM AND METHOD FOR SYNCHRONOUS CONFIGURATION OF DHCP SERVER AND ROUTER INTERFACES

RELATED APPLICATIONS

This nonprovisional patent application is related to the following contemporaneously filed nonprovisional patent applications: U.S. patent application Ser. No. 10/610,989, entitled, "System and Method for Dynamically Configuring and Transitioning Wired and Wireless Networks;" U.S. patent application Ser. No. 10/611,596, entitled "System and Method for Describing Network Resource Availability and Associations;" U.S. patent application Ser. No. 10/611,787, entitled "System and Method for Programmatically Changing the Network Location of a Network Component"; and U.S. patent application Ser. No. 10/611,786, entitled "System and Method for the Design and Description of Networks."

TECHNICAL FIELD

Embodiments of the invention generally relate to the field of networks and, more particularly, to a system and method for synchronous configuration of DHCP server and router interfaces.

BACKGROUND

Mobile networking technologies are driving an evolution in the use and structure of networks. For example, users of mobile networking technologies expect to stay connected as they move from place to place and from network to network. Furthermore, users of mobile networking technologies expect easy and seamless network interface transitions as they move from place to place.

The term network component broadly refers to a node (e.g., a desktop, laptop, etc.) or a collection of nodes (e.g., a virtual private network, a subnet, a virtual local area network, etc.). The term node refers to a network component having a network interface. Examples of a node include switches, routers, servers, clients, workstations, laptops, handhelds, printers, hubs, and the like.

The movement of network components from place to place and network to network fosters constantly changing network infrastructures and topologies. Network components are typically configured to interact with particular network infrastructures and topologies. The term configuration can be used with respect to a network component or to an entire network. When used in association with a network component, configuration refers to the settings of software, hardware, and firmware that enable the network component to exchange information with a network. In a broader sense, configuring a network refers to configuring a plurality of network components to exchange information with one other.

Modern networking technologies increase the variety of network components that interact with a network and, also, the frequency at which these interactions occur. These interactions produce a combinational explosion of heterogeneous networks composed of many different network components each having a distinct configuration. This combinational explosion of heterogeneous networks is further complicated by the possibility that an initial network configuration changes over time as network components are added and removed from the network.

The term subnetwork (subnet) refers to a network that is a part of a larger network. Dividing networks into subnets is a well-known strategy to, for example, increase the performance and enhance the security of a network. Typically, network components within a subnet exchange packets with network components in other subnets (or other networks) through a router.

Figure 1:
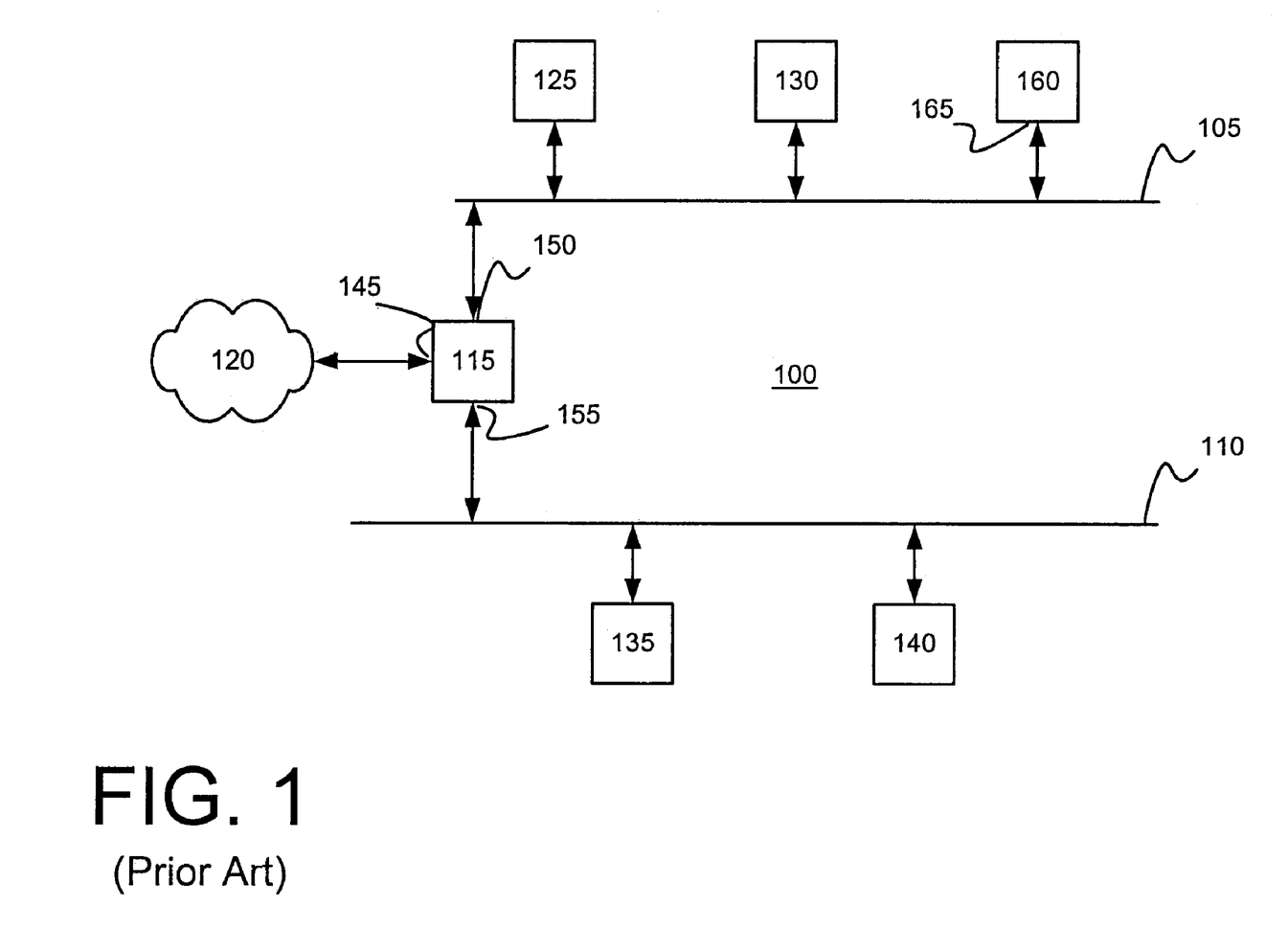
FIG. 1 is a block diagram of a router 115 interconnecting network 100 with Internet 120.

FIG. 1 is a block diagram of a router 115 interconnecting network 100 with the Internet 120. Network 100 includes subnet 105 and subnet 110. Subnet 105 includes nodes 125 and 130, as well as Dynamic Host Configuration Protocol (DHCP) server 160. Similarly, subnet 110 includes nodes 135 and 140. A DHCP server refers to a network component that provides network administrative services in compliance with Request For Comments 2131 entitled, "Dynamic Host Configuration Protocol," R. Droms, March 1997. Router 115 connects subnet 105 and subnet 110 to Internet 120 and to each other. Router 115 includes router interfaces 145, 150, and 155. Each router interface is configured to provide the appropriate interface. For example, router interfaces 150 and 155 are configured with the IP addresses for subnets 105 and 110, respectively. Typically, a network administrator manually configures router interfaces 145, 150, and 155 in a time consuming and error prone process.

DHCP server 160 provides network administrative services to nodes 125 and 130 through DHCP server interface 165. For example, DHCP server 160 informs nodes 125 and 130 that router interface 150 is the gateway through which nodes 125 and 130 reach Internet 120 and subnet 110. In conventional network 100, DHCP interface 165 is manually configured in a slow and error prone process that is analogous to configuring router interface 150.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention enable quick and accurate dynamic configuration of corresponding router and Dynamic Host Configuration Protocol (DHCP) server interfaces. The ability to programmatically configure corresponding router and DHCP server interfaces is especially important in networks that are constantly changing (e.g., networks that contain mobile nodes). Embodiments of the invention ensure that DHCP server interfaces and router interfaces associated with the same subnet are configured with, for example, the appropriate IP address and gateway information.

Figure 2:
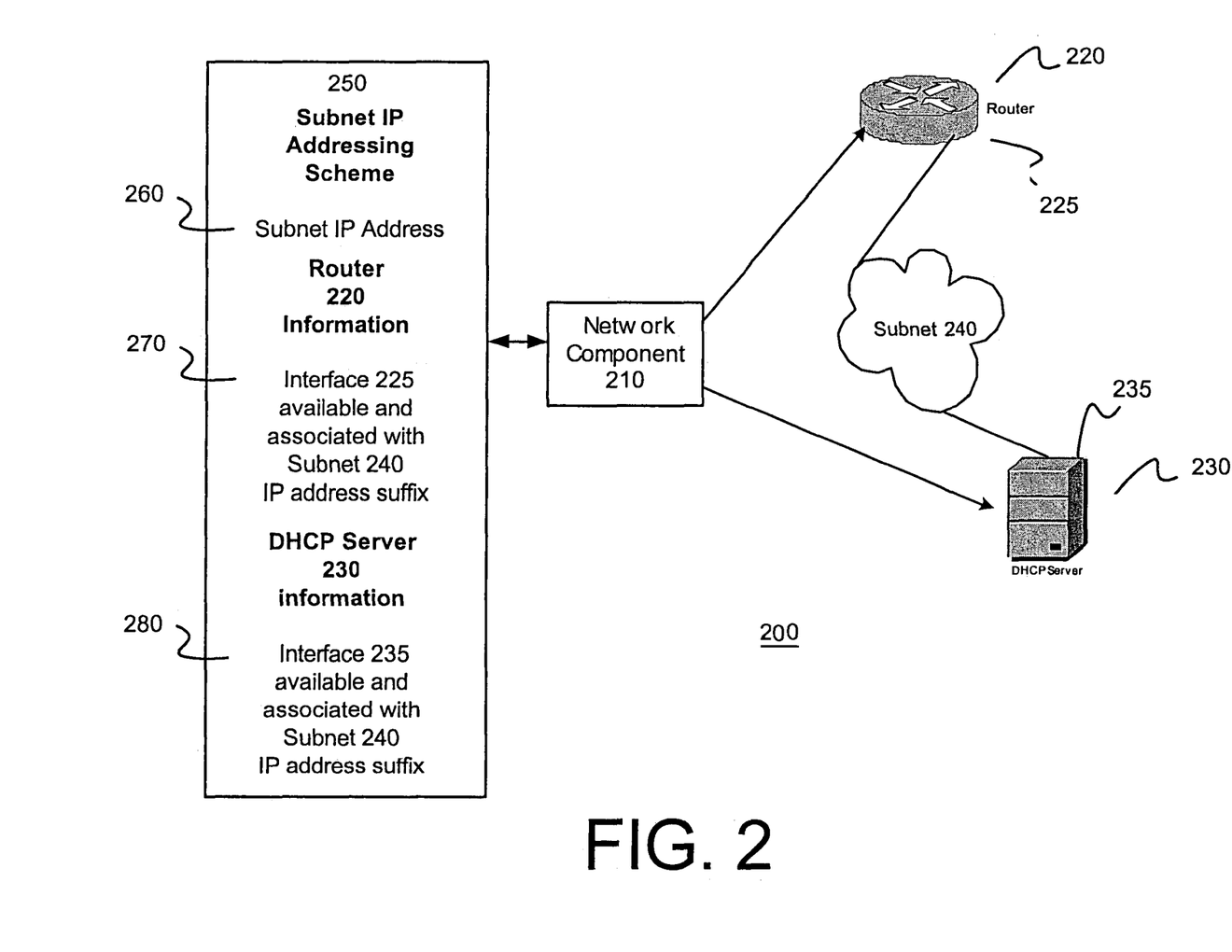
FIG. 2 is block diagram of network 200 implemented according to an embodiment of the invention.

FIG. 2 is block diagram of network 200 implemented according to an embodiment of the invention. FIG. 2 includes network component 210, router 220, DHCP server 230, subnet 240, and network information 250. A person of ordinary skill in the art will appreciate network 200 may include more and/or different components than those shown in FIG. 2. It is not necessary, however, that all of these generally conventional components be shown in order to disclose an illustrative embodiment for practicing the invention.

Network component 210 broadly represents any network component with sufficient processing resources to programmatically configure router 220 and DHCP server 230. In an embodiment of the invention, network component 210 is physically located proximate to router 220 and/or DHCP server 230. In an alternative embodiment of the invention, network component 210 is located at a remote site and connects with router 220 and DHCP server 230 through, for example, a Telnet session. In yet other alternative embodiments of the invention, network component 210 is DHCP server 230. An exemplary embodiment of network component 210 is further described below with respect to FIG. 10.

Router 220 provides packet-forwarding services to network 200, in an embodiment of the invention. In an embodiment of the invention, router 220 executes packet forwarding based on layer 3 criteria. In alternative embodiments of the invention, router 220 executes packet forwarding based on both layer 3 and layer 2 criteria. Router interface 225 may be configured to provide packet-forwarding functions to subnet 240. The configuration of router interface 225 is stored in an electronic file, in an embodiment of the invention (e.g., router section 415, shown in FIG. 4). Routers are well known in the art and will not be further described except as to how they relate to embodiments of the invention.

DHCP server 230 provides network administrative functions in an embodiment of the invention. For example, DHCP server interface 235 may provide IP addresses, subnet masks, and/or gateway information to network components of subnet 240. The description for DHCP server interface 235 may be stored in an electronic file (e.g., DHCP server section 420, shown in FIG. 4). DHCP servers are well known to those of ordinary skill in the art and will not be further described except as to how they relate to embodiments of the invention. In alternative embodiments of the invention, network administrative services may be provided by a network component that complies with Request For Comments 951, entitled, "Bootstrap Protocol (BootP)," B. Croft, J. Gilmore, September 1985.

Network information 250 (may be derived in part from the network resource and association file and/or a virtual map) describes resources within network 200 and, also, the relationships between those resources. The illustrated embodiment of network information 250 includes: subnet IP address section 260, router section 270, and DHCP server section 280. Related U.S. patent application Ser. No. 10/611,596 further describes network resource and association files.

Network component 210 references information (e.g., a virtual map, which may be derived in part from the network resource and association file), to discover whether there is a router and/or a DHCP server associated with network 200, in an embodiment of the invention. Network information 250 is stored in memory and accessed by a processor (not shown) on network component 210, in an embodiment of the invention. In alternative embodiments of the invention, network information 250 is stored on a separate network component of network 200. In yet other alternative embodiments of the invention, network information 250 may be distributed over a plurality of network components or may be provided to network component 210 from a source outside of network 200.

Network component 210 may discover, for example, router 220 and DHCP server 230. Network component 210 may then determine whether router 220 and/or server 230 have an interface associated with subnet 240. In the illustrated embodiment of the invention, network component 210 discovers that router interface 225 and DHCP interface 235 are associated with subnet 240.

After discovering router interface 225 and DHCP interface 235, network component 210 determines an Internet Protocol (IP) address to assign to each interface. Determining an IP address to assign to each interface depends on the IP address naming convention used within a particular network. In an embodiment of the invention, the IP address scheme includes dividing IP address into prefixes and suffixes. The suffix for each IP address may be stored with the corresponding interface in network information 250. The prefix of each IP address may be the network IP address, in an embodiment of the invention. In an embodiment of the invention, network component 210 determines the IP address for each interface by determining the network IP address (e.g., by using a network mask) and combining the network IP address with the corresponding suffix for the respective interfaces stored in network information 250. A person of ordinary skill in the art appreciates that alternative IP addressing schemes may used and alternative methods of deriving the appropriate IP address may used in alternative embodiments of the invention.

In an embodiment of the invention, network component 210 determines additional configuration information. For example, network component 210 determines a gateway IP address for subnet 240, in an embodiment of the invention. In the illustrated embodiment of the invention, the gateway IP address is the same as the IP address for router interface 225. In alternative embodiments of the invention, a different and/or addition gateway addresses may be determined for subnet 240. After determining the appropriate configuration information, network component 210 programmatically configures router 220 and DHCP server 230 with the determined configuration information. Programmatically configuring router 220 and DHCP 230 is further described below with regards to FIG. 9.

Overview of the Functional Layers

Figure 3:
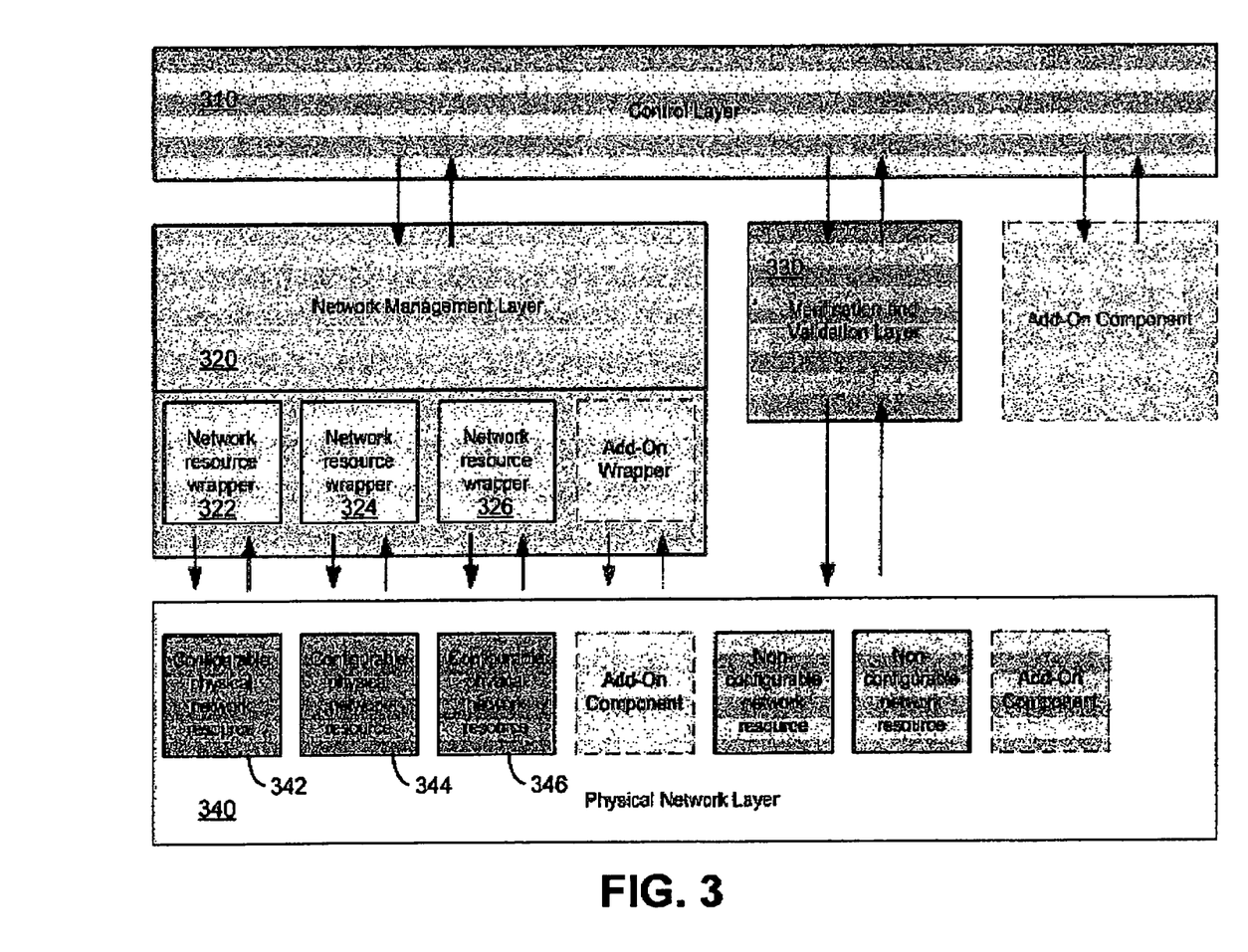
FIG. 3 is block diagram illustrating an embodiment of the invention abstracted into four layers.

To provide the above stated functions, embodiments of the invention may be abstracted into four layers: the control layer, the network management layer, the verification and validation layer, and the physical network layer. FIG. 3 is block diagram illustrating an embodiment of the invention abstracted into four layers. In alternative embodiments of the invention, the functions may be abstracted into more layers or fewer layers. FIG. 3 includes control layer 310, network management layer 320, verification and validation layer 330, and physical network layer 340.

Control layer 310 may provide a single control point for functions provided by embodiments of the invention. Control layer 310 may be accessed through a console directly on a node in close proximity to the network or through a remote login session (e.g., Telnet). The functions of control layer 310 include generating network scenarios and directing the other layers to configure and transition the network based on the generated network scenarios, in an embodiment of the invention. Network scenarios may be generated randomly or may be based on predefined network configurations, in an embodiment of the invention. Also, control layer 310 may generate a series of network scenarios back-to-back. Each series of network scenarios can be reproduced by supplying a seed logged in past scenarios, in an embodiment of the invention.

Control layer 310 determines the current physical layout and state of the network based on its interactions with network management layer 320 and verification and validation layer 330, in an embodiment of the invention. As will be further described below, control layer 310 accesses network management layer 320 to perform network configurations and network transitions. Transitioning a node broadly refers to, for example, transitioning a node from a first network interface to a second interface, and/or from a first subnet to a second subnet, and/or from a first Virtual Local Area Network (VLAN) to a second VLAN, and/or from a first topology to a second topology. The term network transition refers to transitioning one or more nodes within the network.

Network management layer 320 provides a number of functions including network configurations, network transitions, and maintenance of current network state information, in an embodiment of the invention. Network management layer 320 may be a stand-alone component for managing and reconfiguring network components. In alternative embodiments of the invention, network management layer 320 functions in association with the other layers illustrated in FIG. 3. In such an embodiment, the other layers may obtain network state information from network management layer 320.

Figure 4:
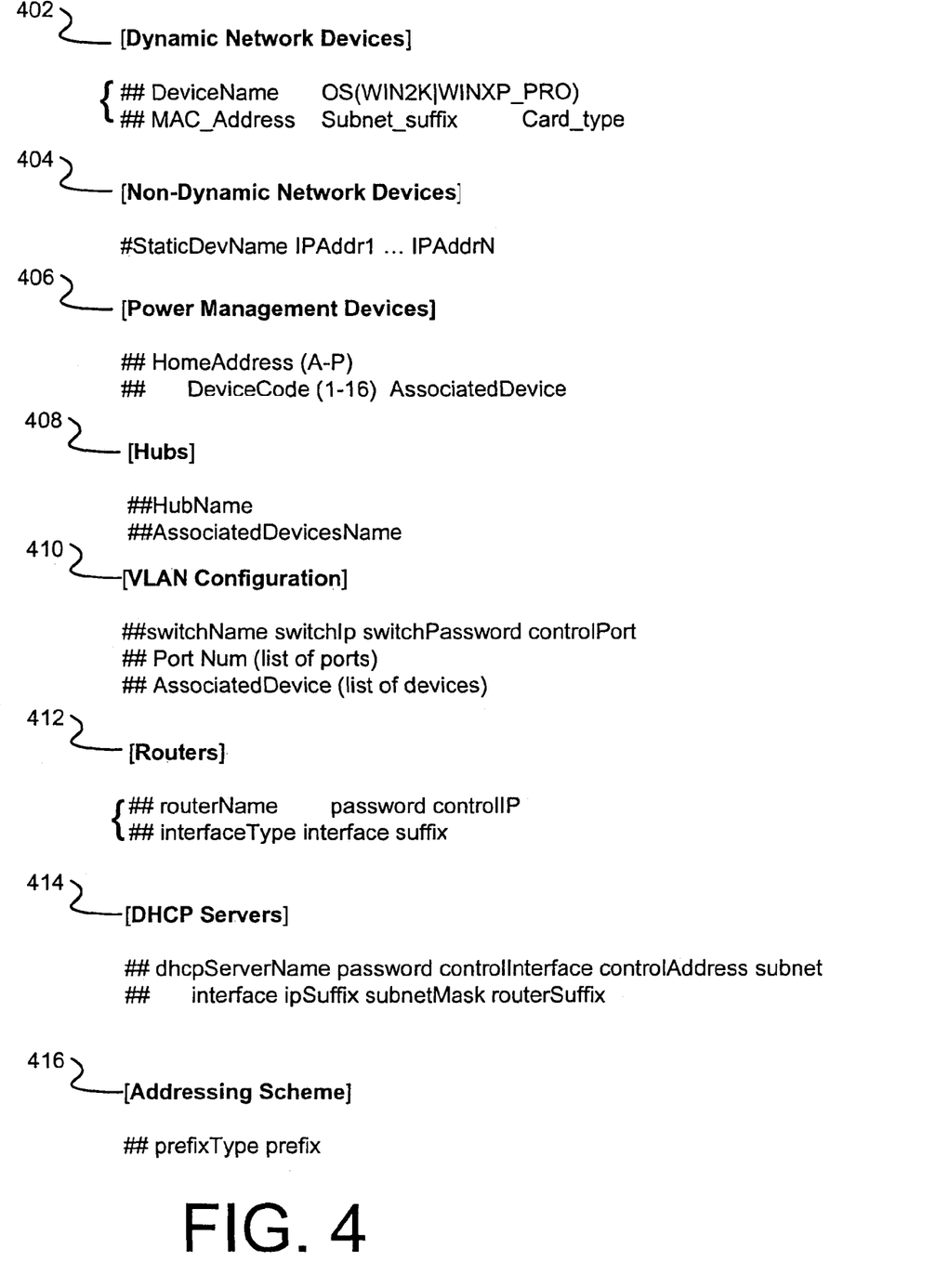
FIG. 4 illustrates selected elements of exemplary network resource and association file 400.

FIG. 4 illustrates selected elements of exemplary network resource and association file 400. Network resource and association file 400 includes: dynamic network device section 402, hon-dynamic network device section 404, power management device section 406, hubs section 408, Virtual Local Area Network (VLAN) switch section 410, router section 412, Dynamic Host Configuration Protocol (DHOP) server section 414, and addressing scheme section 416. A DEEP server refers to a network component that provides network administrative services in compliance with Request For Comments 2131 entitled, "Dynamic Host Configuration Protocol," R. Droms, March 1997. As illustrated in FIG. 4, network resource and association file 400 describes available network resources and associations in a standardized syntax. Related U.S. patent application Ser. No. 10/611,596 further describes network resource and association files.

Network management layer 320, in an embodiment of the invention, is responsible for configuring networks and transitioning networks. As is further discussed below in regard to FIG. 6, network resource wrappers 322, 324, and 326 may be used to configure and transition networks. In addition, network management layer 320 may maintain IP address allocation for network components and generate a readable text file that reports each IP address to facilitate communication across the network. After each network configuration and/or transition, network management layer 320 may generate a snapshot of the current network state.

Figure 5:
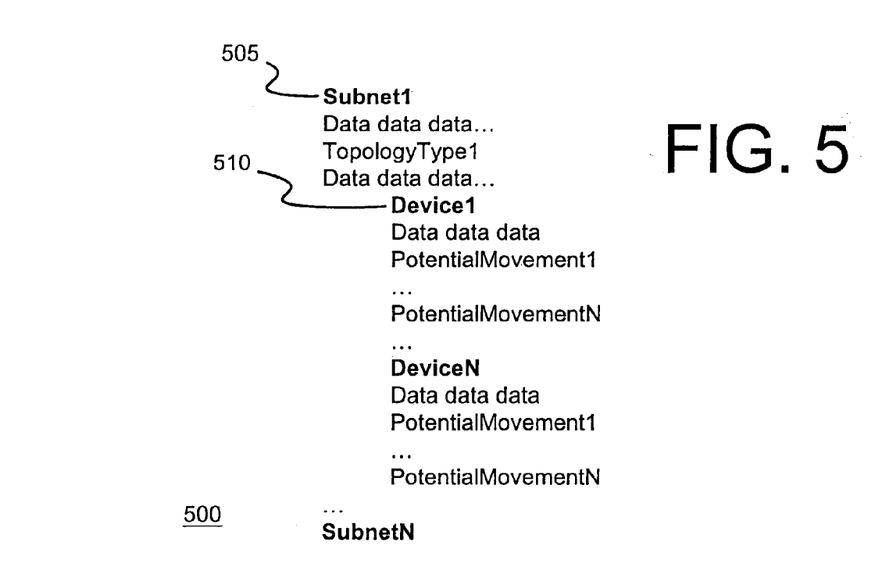
FIG. 5 is an illustration of an exemplary current network state snapshot 500.

FIG. 5 is an illustration of an exemplary current network state snapshot 500. The illustrated embodiment of current network state snapshot 500 is organized according to one or more subnets sections (e.g., subnet section 505). Each subnet section contains information about one or more network components within the subnet (e.g., node section 510). Node section 510 includes information about potential movement. Information about potential movement may include a list of network topologies based on network topologies and interfaces available to the node. For example, if a node contains an 802.11a network adaptor (and an 802.11a access point exists on the network), the node is able to make a transition to a wireless network connection. Network state snapshot 500 is more fully described in related U.S. patent application Ser. No. 10/611,786, An 802.11a network adaptor and an 802.11a access point respectively refer to a network adaptor and an access point that comply with the IEEE 802.11 standard, entitled "Wireless LAN Medium Access Control (MAC) and Physical Layer (PHY) Specifications, 1999 Edition."

After a network transition, multiple sections of network state snapshot 500 may be updated since some network transitions affect multiple network components. Network management layer 320 uses network resource wrappers to programmatically configure network components, in an embodiment of the invention. Network resource wrappers abstract the functionality of a network component in a standardized way that allows network components to be interchanged when the components provide the same (or similar) functionality, in an embodiment of the invention. The term programmatically broadly refers to action performed by a software, hardware, and/or firmware resource of one or more network components.

Figure 6:
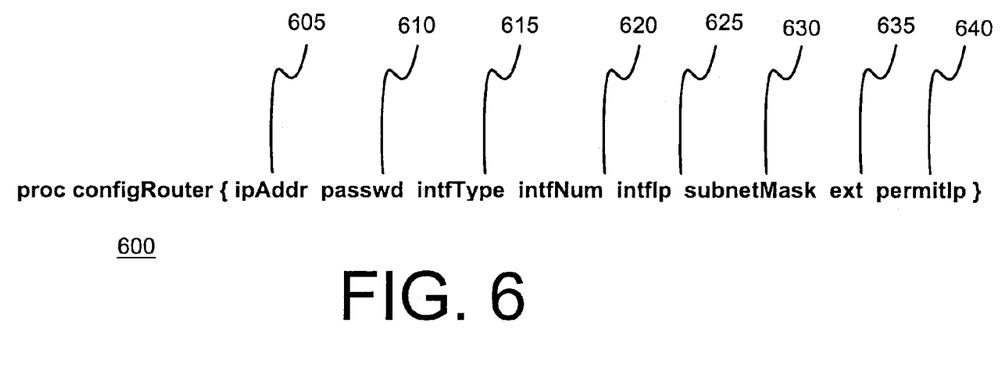
FIG. 6 is an exemplary illustration of network resource wrapper function call 600 with possible function parameters.

FIG. 6 is an exemplary illustration of network resource wrapper function call 600. Network resource wrapper function call 600 may be used, for example, to configure a router. A person of ordinary skill in the art appreciates that similar network components may be configured with similar network resource wrappers. In an embodiment of the invention, there is a network resource wrapper corresponding to each configurable network component in a network. Table 1 provides a description of the fields of exemplary network resource wrapper function call 600.

TABLE 1

| Field | Description |
|---|---|
| IpAddr 605 | IpAddr 605 is the IP address from which the router can be configured, in an embodiment of the invention. |
| Passwd 610 | Passwd 610 may be used to, for example, enable a Telnet session to the router. |
| IntfType 615 | IntfType 615 represents the type of interface to be modified (e.g., Ethernet) on the router. |
| IntfNum 620 | IntfNum 620 is the number of the interface to be modified, in an embodiment of the invention. |
| IntfIp 625 | IntfIp 625 provides the new IP address for the interface, in an embodiment of the invention. |
| SubnetMask 630 | SubnetMask 630 provides the subnet mask for the subnet with which the interface is associated. |
| Ext 635 | Ext 635 indicates whether the interface is "inside" or "outside" of a VPN, in an embodiment of the invention. |
| PermitIP 640 | PermitIP 640 represents IP addresses that are permitted on the interface, in an embodiment of the invention. |

Referring again to FIG. 3, verification and validation layer 330 abstracts all devices that are used to verify and validate the current network configuration. These devices may include, for example, packet sniffers, traffic generators, and other network validation devices. In an embodiment of the invention, third party verification tools and/or proprietary tools can be added to this layer to provide seamless accessibility to a wide range of network analysis and traffic generation tools.

In an embodiment of the invention, the network validation devices are mobile. For example, during network scenario execution, network validation devices may be placed on the particular subnet that requires validation. In contrast, conventional network validation typically involves the manual movement of validation devices from one subnet to another, and/or one VLAN to another, and/or one network interface to another.

Control layer 310 interoperates with verification and validation layer 330 to perform graceful state recovery, in an embodiment of the invention. During the execution of a network scenario, verification and validation layer 330 detects and logs results to report to the control layer. Control layer 310 determines whether to perform graceful state recovery based on the errors, if any, logged and reported by the verification and validation layer. Graceful state recovery refers to reconfiguring network components to a state they were in before an error occurs during the execution of a network scenario.

Physical network layer 340 contains the physical network devices of network 300 (e.g., physical network resources 342, 344, and 346). In an embodiment of the invention, physical network resources 342, 344, and 346 correspond to network resource wrappers 322, 324, and 326 described above with respect to FIG. 6. Control layer 310 may request the functionality of physical network resources 342, 344, and 346 through a network configuration request.

Figure 7:
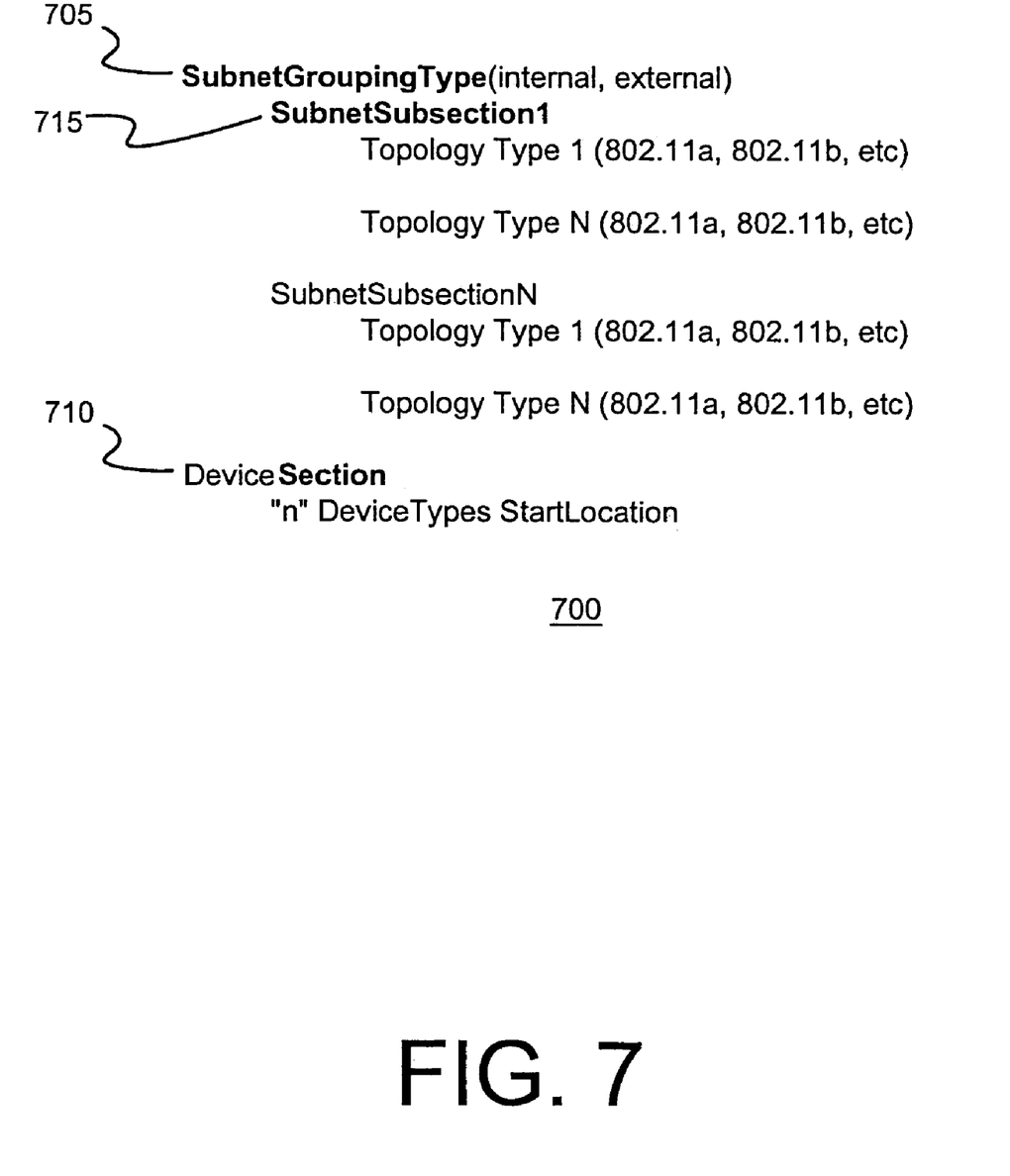
FIG. 7 illustrates exemplary network configuration request 700.

FIG. 7 illustrates exemplary network configuration request 700. Network configuration request 700 includes subnet group section 705 and device section 710. Subnet group section 705 may be used to organize a plurality of subnet subsections (e.g., subnet subsection 715). Each subnet subsection may list information about the type of network topology requested for the subnet. For example, a particular subnet may include both wired and wireless network topology. Device section 710 may include information about nodes within a requested network configuration and a start position for mobile nodes within a requested network configuration. Network configuration requests are more fully described in related U.S. patent application Ser. No. 10/611,596.

In operation, control layer 310 may send a network configuration request to network management layer 320. Network management layer 320, in turn, may use network resource wrappers to programmatically configure the physical resources in physical network layer 340. When new physical resources are added to network 300, corresponding network wrappers may be written to network management layer 320 to abstract the functionality of the new resource. In an embodiment of the invention, non-configurable network resources may be added and/or removed from network 300 at will because network resource wrappers are not needed to interact with non-configurable network resources.

Interactions Among the Layers

Figure 8:
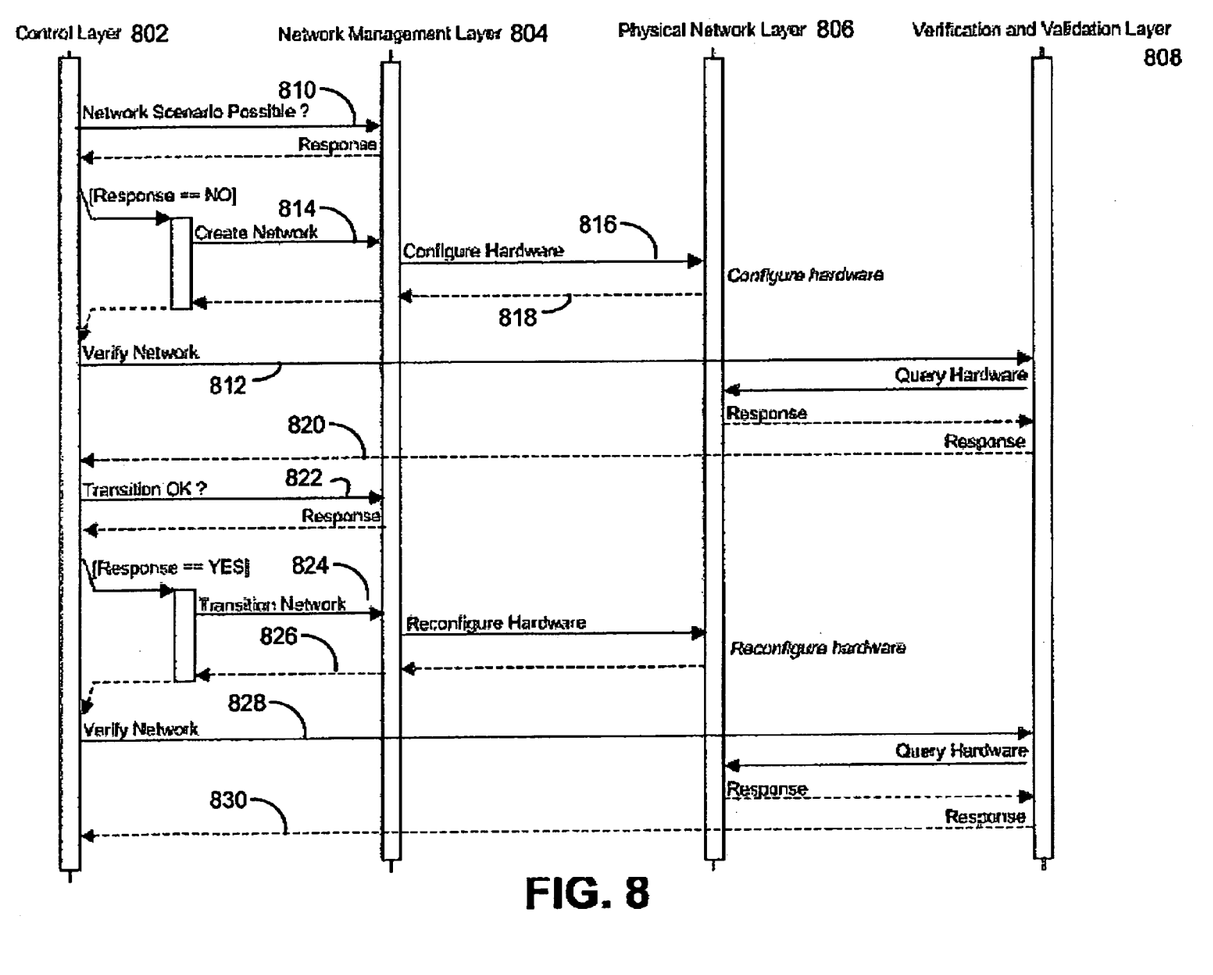
FIG. 8 is a conceptual illustration of selected interactions between abstract functional layers in network 800, according to an embodiment of the invention.

FIG. 8 is a conceptual illustration of selected interactions between abstract functional layers in network 800, according to an embodiment of the invention. Network 800 includes control layer 802, network management layer 804, physical network layer 806, and verification and validation layer 808. A person of ordinary skill in the art will appreciate that, in alternative embodiment embodiments of the invention, network 800 may include more layers or fewer layers.

A user may provide an input to initiate a network scenario, in an embodiment of the invention (not shown). Control layer 802 queries network management layer 804 to determine if executing the network scenario is possible given the current network configuration at 810. If the network scenario is supported in the current network configuration, control layer 802 initiates network verification and validation at 812.

Otherwise control layer 802 resolves the network scenario into a network configuration and creates a corresponding network configuration request at 814. The network configuration request may contain one or more subnets as well as the starting position on the network for mobile nodes. Network management layer 804 configures the network at 816 and reports success or failure of the configuration at 818. If network management layer 804 does not report any failures occurring during the configuration process, control layer 802 triggers the verification and validation layer 808 at 812. Verification and validation layer 808 performs network verification and/or validation tests and reports the findings to control layer 802 at 820.

A network scenario may include transitioning one or more nodes. For example, a network scenario may include transitioning a node from a wired LAN connection to a wireless LAN connection. Control layer 802 queries network management layer 804 to determine whether a transition is supported by the network configuration at 822. If the transition is supported then control layer 802 requests the transition at 824. Network management layer 804 reports success or failure of the transition at 826. If the transition is successful, control layer 802 prompts verification and validation layer 808 to perform appropriate tests at 828 and report the findings to control layer 802 at 830.

Embodiments of the invention may iterate the network configuration and transition processes to enable multiple network scenarios to occur one after another. Alternatively, the network scenario process may terminate after a single iteration. In such an embodiment, the findings of the completed network scenario may be reported to a user and a pseudo-random seed to reproduce the network scenario may be stored.

Figure 9:
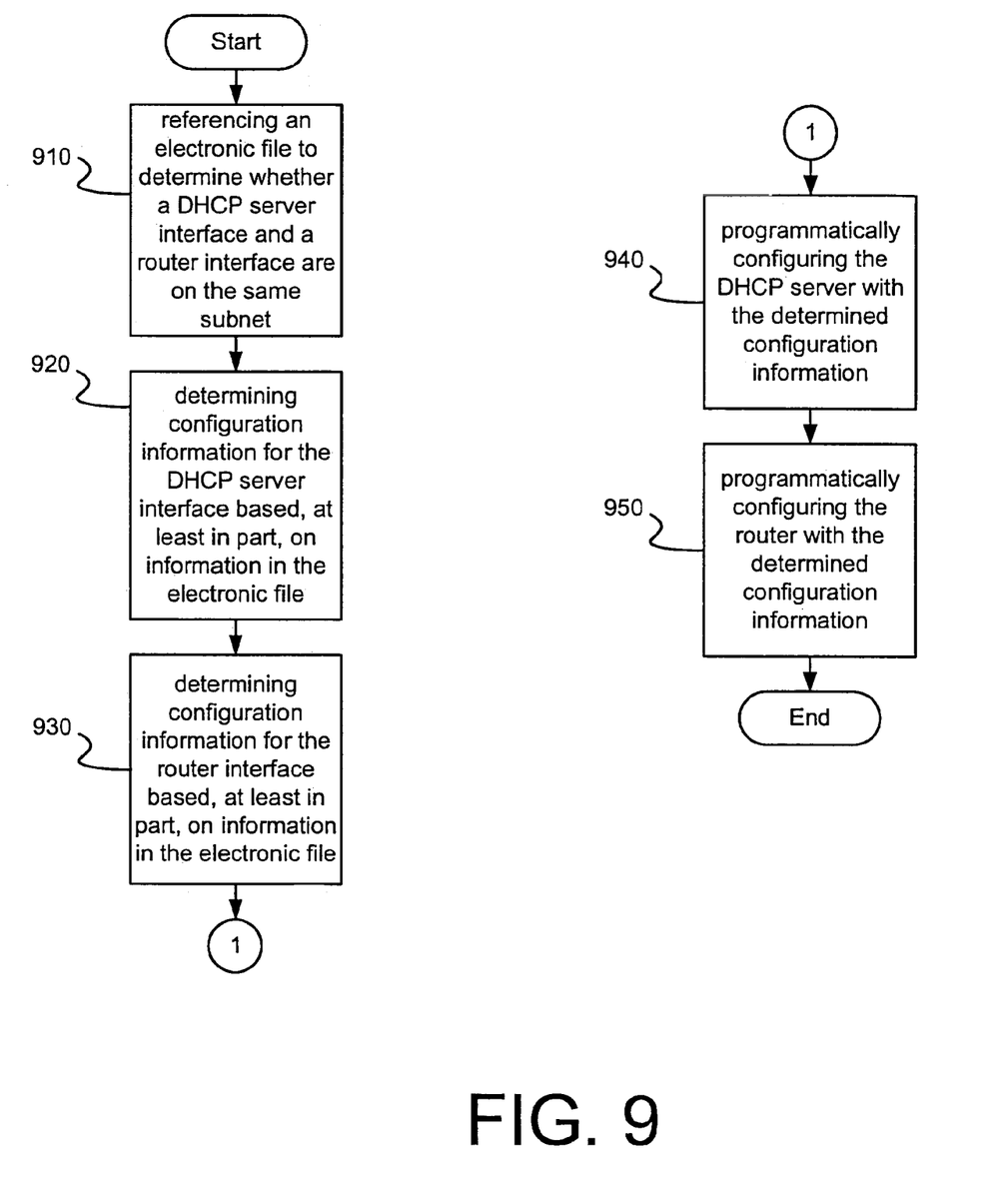
FIG. 9 is a flow diagram illustrating certain aspects of a method for configuring a router interface and a corresponding Dynamic Host Configuration Protocol (DHCP) server interface, according to an embodiment of the invention.

Turning now to FIG. 9, the particular methods associated with embodiments of the invention are described in terms of computer software and hardware with reference to a flowchart. The methods to be performed by a control layer and/or a management layer may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a network component) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, process, procedure, agent, application, etc.), as taking an action or causing a result. Such expressions are merely a shorthand way of saying that execution of the software by a computing device causes the device to perform an action or produce a result. For ease of discussion, the entities performing the functions of each layer are hereinafter referred to as agents. For example, the entity (or entities) performing the functions of the management layer is referred to as the management agent. An agent may be executable content, control logic, firmware, or some combination thereof, in an embodiment of the invention.

FIG. 9 is a flow diagram illustrating certain aspects of a method for configuring a router interface and a corresponding Dynamic Host Configuration Protocol (DHCP) server interface. Referring to process block 910, a network management agent (not shown) references information (e.g., a virtual map, which may be derived, in part, from the network resource and association file) to determine whether a DHCP server interface and a router interface are associated with the same subnet. The network management agent may reference a file of network components that may include addressing scheme information to identify the addressing scheme used by the listed network components. The referenced file lies a standardized syntax in an embodiment of the invention. Network information 250, shown in FIG. 2 and network resource and association file 400 shown in FIG. 4 are examples of electronic files that list network components with a standardized syntax. Network resource and association flies are more fully described in related U.S. patent application Ser. No. 10/611,596.

In an embodiment of the invention, the network management agent resides on a (DHCP) server. A DHCP server refers to a server that is compliant with Request for Comments 1541, "Dynamic Host Configuration Protocol," R. Droms, October 1993. In an alternative embodiment of the invention, the network management agent may reside on a control node. A person of ordinary skill in the art appreciates that the network management agent may reside on any of a number of different network components or may be distributed among a number of network components.

Referring to process block 920, in an embodiment of the invention, the network management agent determines configuration Information forte DHCP server interface based, at least in part, on information in the referenced electronic file. Determining configuration information broadly refers to determining information to enable the DHCP server interface to provide network administrative services to network components within a subnet. The network management agent may determine an IP address for the DHCP server interface based on the addressing scheme information in the referenced file. The network management agent may also determine a gateway IP address to distribute to DHCP clients within the subnet. In the illustrated embodiment of the invention, the gateway IP address is the IP address of the corresponding router interface. In some embodiments network management agent automatically determines the configuration information forte DHCP server interface based, at least in part, on Information in the referenced electronic file.

Referring to process block 930, in an embodiment of the invention, the network management agent determines configuration information for the router interface based, at least in part, on information in the referenced electronic file. Determining configuration information broadly refers to determining information to enable the router interface to provide a gateway from the subnet to other subnets and/or the Internet. Determining configuration information may include, for example, determining an IP address for the router interface so that the muter interface can serve as a gateway for the subnet. In some embodiments, the network management agent automatically determines the configuration information for the router interface based, at least in part, on information In the referenced electronic file.

Referring to process block 940, in an embodiment of the invention, the network management agent programmatically configures the DHCP server with the determined configuration information. For example, the network management agent may call a function (e.g., network resource wrapper function call, shown in FIG. 6) to interact with the DHCP server and change its state. The network management agent may pass configuration information to the called function, which may then programmatically configure the DHCP server. For example, the network management agent may pass the IP address of the router interface, the subnet mask, the gateway IP address, and/or other information to the called function.

Referring to process block 950, in an embodiment of the invention, the network management agent programmatically configures the router with the determined configuration information. For example, the network management agent may call a function (e.g., network resource wrapper function call, shown in FIG. 6) to interact with the router and change its state. The network management agent may pass configuration information to the called function, which may then programmatically configure the router. For example, the network management agent may pass the Internet Protocol address of the DHCP server interface, the subnet mask, and/or other information to the called function.

Figure 10:
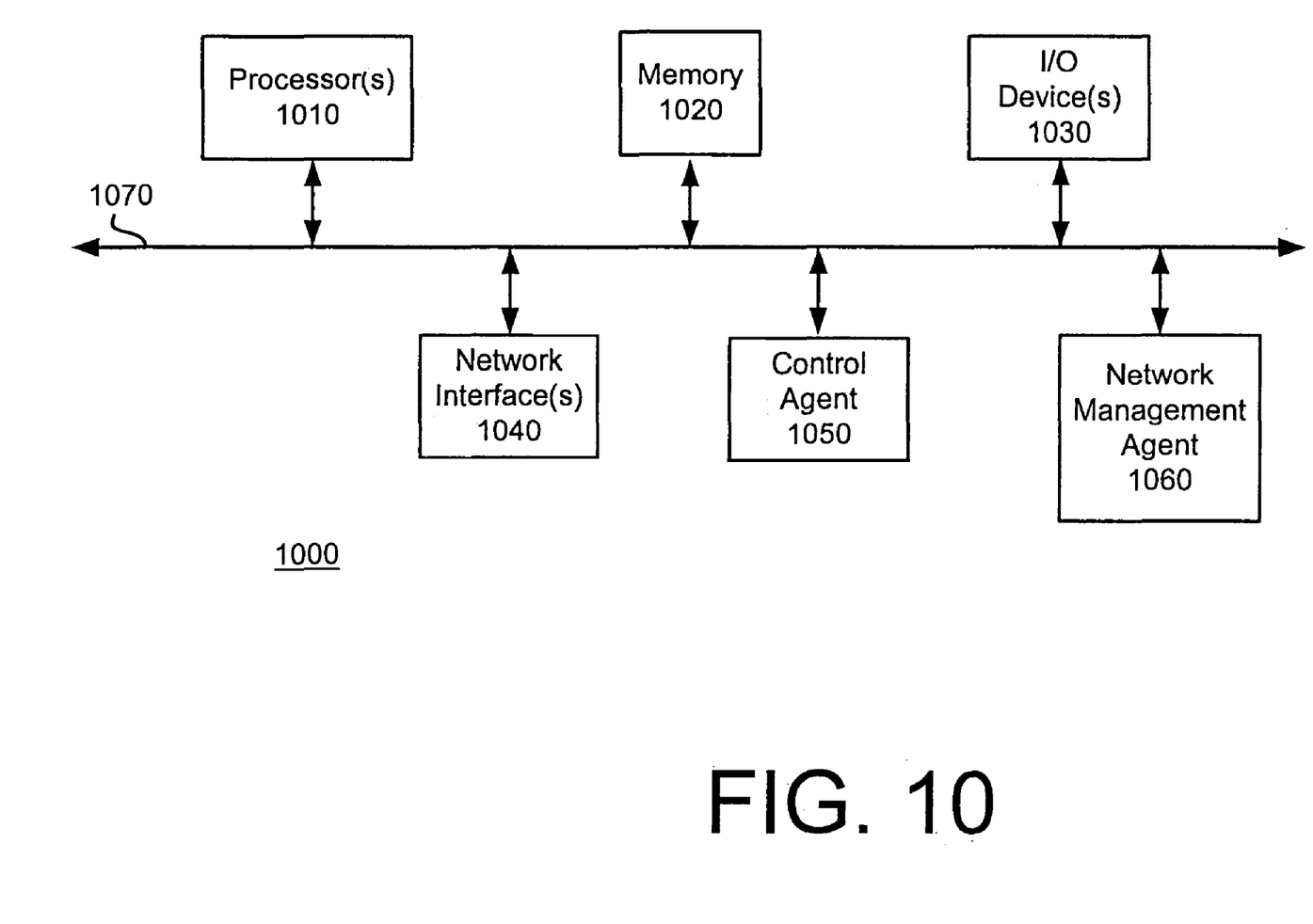
FIG. 10 is a simplified block diagram of selected elements of exemplary node 1000, implemented according to an embodiment of the invention.

FIG. 10 is a simplified block diagram of selected elements of exemplary node 1000, implemented according to an embodiment of the invention. Node 1000 may include: one or more processor(s) 1010, memory 1020, one or more Input/Output interfaces 1030, network interface(s) 1040, control agent 1050, management agent 1060. The illustrated elements may be connected together through system interconnect 1070. Processor(s) 1010 may include a microprocessor, microcontroller, field programmable gate array (FPGA), application specific integrated circuit (ASIC), central processing unit (CPU), programmable logic device (PLD), and similar devices that access instructions from system storage (e.g., memory 1020), decode them, and execute those instructions by performing arithmetic and logical operations. In some embodiments of the invention, processor(s) 1020 is implemented with a plurality of processors.

Memory 1020 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1020 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1020 may store program modules such as routines, programs, objects, images, data structures, program data, and other program modules that perform particular tasks or implement particular abstract data types that facilitate system use.

One or more I/O interfaces 1030 may include a hard disk drive interface, a magnetic disk drive interface, an optical drive interface, a parallel port, serial controller or super I/O controller, serial port, universal serial bus (USB) port, a display device interface (e.g., video adapter), a sound card, modem, and the like.

Network interface(s) 1040 may include a wide variety of software, hardware, and/or firmware to interface node 1000 with an associated network (not shown). In an embodiment of the invention, network interface 1040 includes both wired (e.g., local area network) interfaces and wireless (e.g., wireless local area network) interfaces. Network interface(s) 1040 may include network interface card(s) and/or chipsets that provide a network interface.

Control agent 1050 enables node 1000 to act as a single control point for a network to which node 1000 is connected. Control agent 1050 may be executable content, control logic (e.g., ASIC, PLD, FPGA, etc.), firmware, or some combination thereof, in an embodiment of the invention. In embodiments of the invention in which control agent 1050 is executable content, it may be stored in memory 1020 and executed by processor(s) 1010.

Management agent 1060 enables node 1000 to perform network configuration changes and network transitions, in an embodiment of the invention. Management agent 1060 may be executable content, control logic (e.g., ASIC, PLD, FPGA, etc.), firmware, or some combination thereof, in an embodiment of the invention. In embodiments of the invention in which management agent 1060 is executable content, it may be stored in memory 1020 and executed by processor(s) 1010. In the illustrated embodiment of the invention, management agent 1060 resides on the same node as control agent 1050. In alternative embodiments of the invention, control agent 1050 and management agent 1060 reside on separate nodes. In yet other alternative embodiments of the invention, control agent 1050 and/or management agent 1060 are distributed across more than one node.

System interconnect 1070 permits communication between the various elements of node 1070. System interconnect 1070 may include a wide variety of signal lines including one or more of a memory bus, peripheral bus, local bus, host bus, bridge, optical, electrical, acoustical, and other propagated signal lines.

Figure 11:
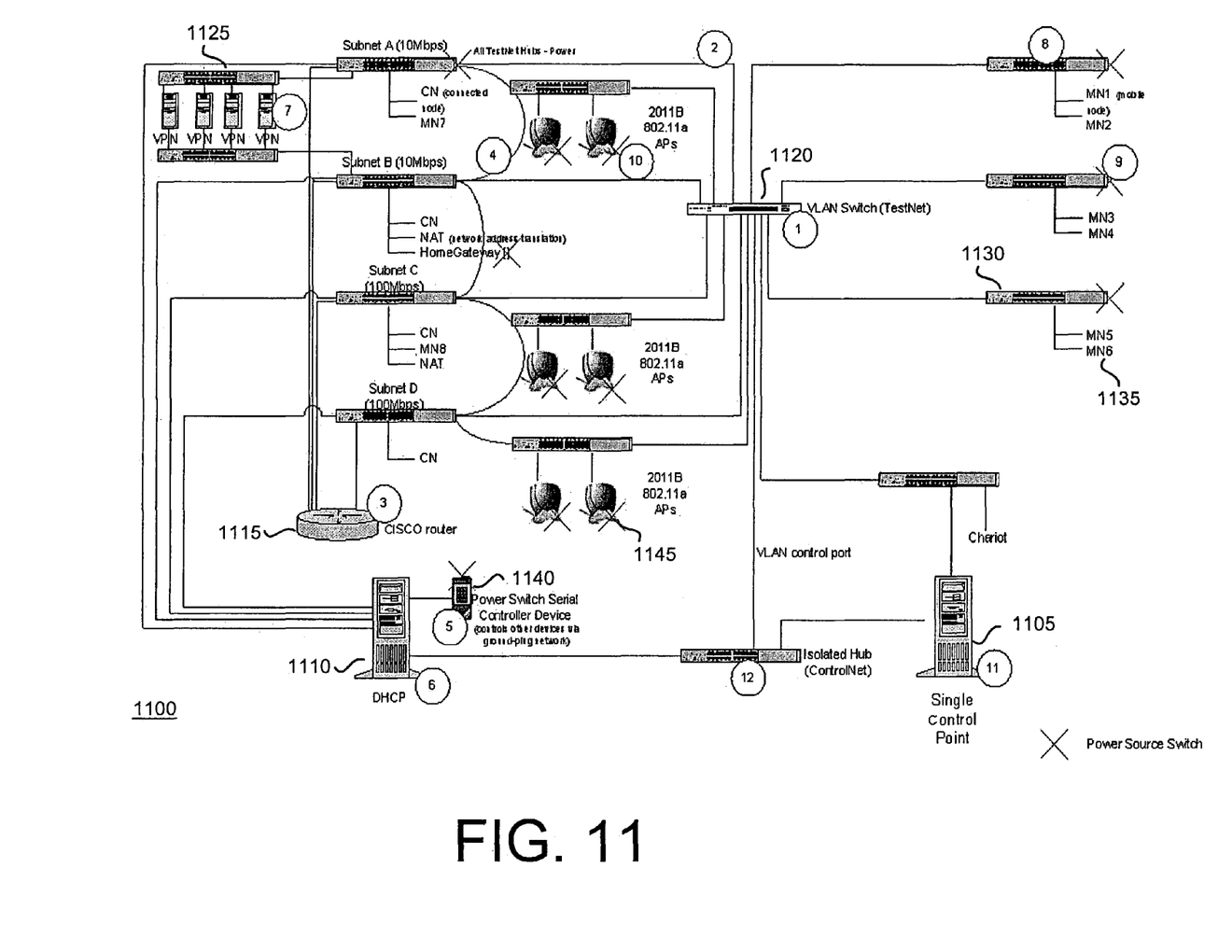
FIG. 11 is a block diagram of selected elements of exemplary network 1100, implemented according to an embodiment of the invention.

FIG. 11 is a block diagram of selected elements of exemplary network 1100, implemented according to an embodiment of the invention. Network 1100 includes control node 1105, DHCP server 1110, router 1115, VLAN switch 1120, Virtual Private Network (VPN) 1125, hub 1130, and node 1135, power switch serial controller device 1140, and access point 1145.

Control node 1105 provides a single control point for executing network configurations, network transitions, and/ or network scenarios, in an embodiment of the invention. A control agent (e.g., control agent 1050 shown in FIG. 10) resides on control node 1105 in an embodiment of the invention. In alternative embodiments of the invention, a control agent and a management agent (e.g., management agent 1040 shown in FIG. 10) reside on control node 1105. Control node 1105 may be a general purpose computing device containing a control agent, in an embodiment of the invention.

DHCP server 1110 provides network administrative functions in an embodiment of the invention. For example, DHCP server 1110 may provide IP addresses, subnet masks, and/or gateway information to network components of network 1100. The DHCP server may associate one or more network interfaces with corresponding IP address information (e.g., IP address, subnet mask, and gateway). The associations between network interfaces and corresponding IP address information determine which nodes receive which network administrative functions, in an embodiment of the invention. DHCP servers are well known to those of ordinary skill in the art and will not be further described except as to how they relate to embodiments of the invention. In an embodiment of the invention a network management agent resides on DHCP server 1110. In such an embodiment of the invention, DHCP server 1110 may be referred to as a management node. The term management node broadly refers to a node on which a management agent (or a portion of a management agent) resides.

Router 1115 provides a number of network interfaces in an embodiment of the invention. Each network interface may be associated with IP address information (e.g., interface IP address and subnet) to enable the exchange of packets with the interface. Routers are well known to those of ordinary skill in the art and will not further described except as to how they relate to embodiments of the invention.

VLAN switch 1120 provides a plurality of ports and supports a plurality of VLANs, in an embodiment of the invention. Each supported VLAN may include one or more ports. Each port may be connected to one or more network components. VLAN switch 1120 enables an embodiment of the invention to group hubs together programmatically into logical subnets. VLAN switches are well known to those of ordinary skill in the art and will not be further described except as to how they relate to embodiments of the invention.

VPN 1125 provides a mechanism for secure transactions in an embodiment of the invention. In some embodiments of the invention, one or more VPNs employ static IP address configurations. In such embodiments of the invention, a network management agent may create the specific subnets used to communicate with the statically configured VPN. This may be accomplished, for example, by configuring the IP addresses on the DHCP server with the subnet IP addresses that correspond to the specific VPN. In addition, router 1115 may be configured to isolate network traffic on either side of the VPN so that only VPN traffic is routed. Internal traffic refers to traffic within the VPN (or firewall) and external traffic refers to traffic outside of the VPN (or firewall). VPNs are well known to those of ordinary skill in the art and will not be further described except as to how they relate to embodiments of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A network comprising:
    a router having a router interface associated with a subnet;
    a DHCP server having a DHCP interface associated with the subnet; and
    a node coupled with the router and the DHCP server and having a processor and logic executable thereon to
        reference an electronic file to determine whether a DHCP server interface and a router interface are on the same subnet; and
        determine configuration information for the DHCP server interface based, at least in part, on information in the electronic file; and determine configuration information for the router interface based, at least in part, on information in the electronic file.

2. The network of claim 1, wherein the referenced electronic file comprises a list of network components having a standardized syntax.

3. The network of claim 2, wherein the electronic list of network components includes addressing scheme information to identify an addressing scheme for the listed network components.

4. The network of claim 1, wherein the node coupled with the router and the DHCP server and having a processor and logic executable thereon to automatically determine configuration information for the DHCP server interface based, at least in part, on information in the electronic file comprises logic executable to
    determine an IP address of the DHCP server interface; and
    determine a gateway IP address for the subnet.

5. The network of claim 1, wherein the node coupled with the router and the DHCP server and having a processor and logic executable thereon comprises logic executable thereon further to
    programmatically configure the router with the determined configuration information; and to
    programmatically configure the DHCP server with the determined configuration information.

6. The network of claim 1, wherein to node is the DHCP server.

7. A network comprising:
    a router having a router interface associated with a subnet;
    a Bootstrap Protocol (BOOTP) compliant server having an interface associated with the subnet; and
    a node coupled with the router and the BOOTP compliant server and having a processor and logic executable thereon to
    reference an electronic file to determine whether a BOOTP compliant server interface and a router interface are on the same subnet; and
    automatically determine configuration information for the BOOTP compliant server interface based, at least in part, on information in the referenced electronic file; and
    automatically determine configuration information for the router interface based, at least in part, on information in the referenced electronic file.

8. The network of claim 7, wherein the referenced electronic file comprises a list of network components having a standardized syntax.

9. The network of claim 7, wherein the node coupled with the router and the BOOTP compliant server and having a processor and logic executable thereon comprises logic executable thereon further to
    programmatically configure the router with the determined configuration information; and to
    programmatically configure the BOOTP compliant server with the determined configuration information.

* * * * *